Dec. 24, 1957   P. R. VANDERSLICE ET AL   2,817,429
BULB FEED FOR TUBE MAKING MACHINE
Filed Oct. 19, 1953                        2 Sheets-Sheet 1

INVENTORS
ALFRED J. GOODWIN
PERRY R. VANDERSLICE
BY
Michael Hertz,
ATTORNEY

Dec. 24, 1957 P. R. VANDERSLICE ET AL 2,817,429
BULB FEED FOR TUBE MAKING MACHINE
Filed Oct. 19, 1953 2 Sheets-Sheet 2

INVENTORS
ALFRED J. GOODWIN
PERRY R. VANDERSLICE
BY
Michael Hertz
ATTORNEY

United States Patent Office 2,817,429
Patented Dec. 24, 1957

2,817,429

BULB FEED FOR TUBE MAKING MACHINE

Perry R. Vanderslice and Alfred J. Goodwin, Shawnee, Okla., assignors to Sylvania Electric Products Inc., a corporation of Massachusetts Application October 19, 1953, Serial No. 386,875

1 Claim. (Cl. 198—24)

This invention relates to means for feeding bulbs to an associated machine such as a tube making machine.

In the past, bulbs have been fed to such a machine by feeding mechanism involving hoppers in which the bulbs were placed and from which they are fed along chutes to a gate, operating in timed relation with the rotating movement of a turret of the tube making machine, to gate the tubes into the path of a transfer mechanism that would transfer the bulbs from the chute into chucks in the machine. However, with this mechanism much breakage of glass ensued and the production of tubes was slowed down by the inefficient operation of the feed mechanism.

It is an object of this invention to provide a mechanism which is simple in construction to provide for more efficient feeding of bulbs to the tube making machine and with less breakage of the bulbs.

It is another object of this invention to provide a mechanism that will enable a speeding up in production of the tube making machine.

These and other objects will be self evident after reading the following specification and claim in conjunction with the accompanying drawing in which:

Figure 1:
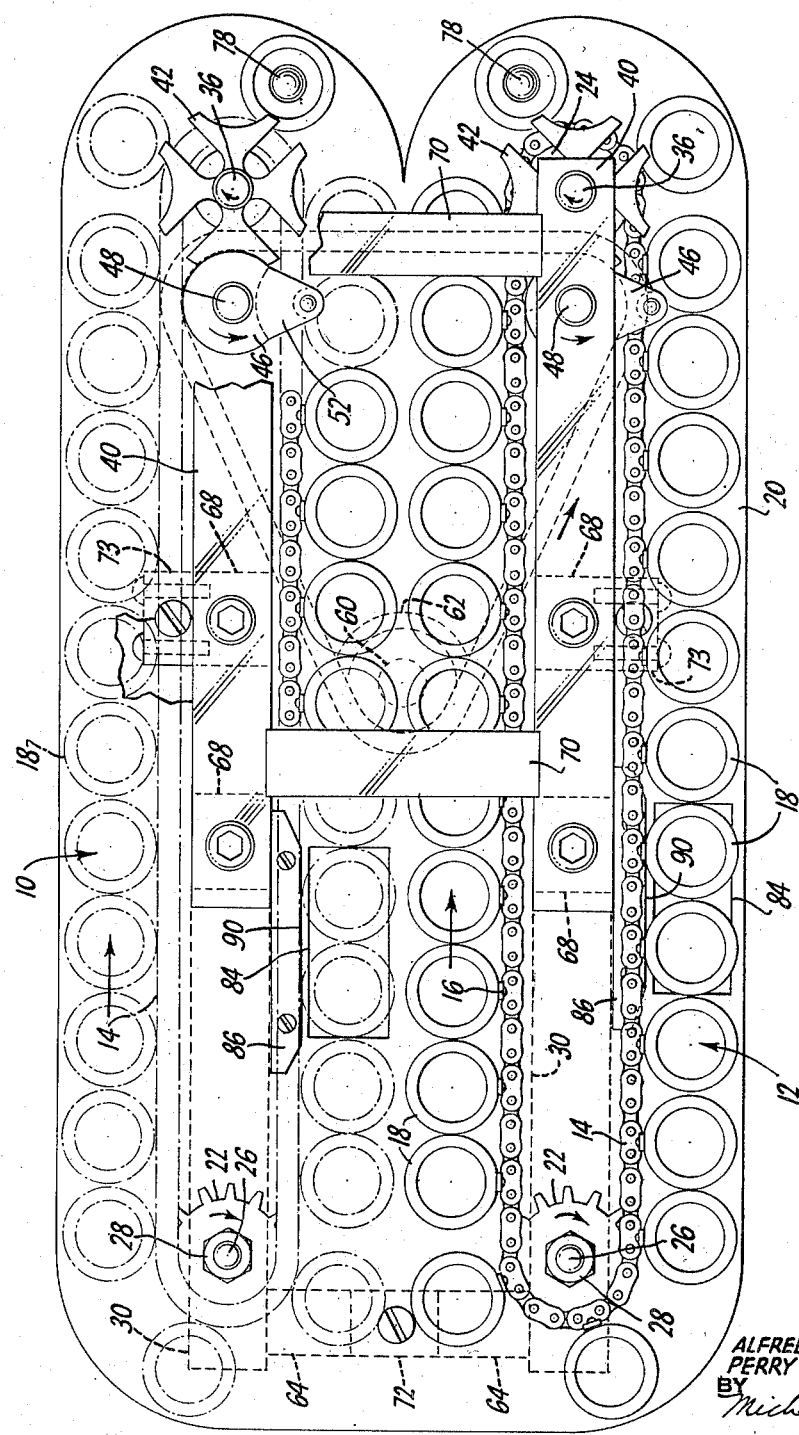
Fig. 1 is a plan view of the feeding mechanism, portions being broken away to expose underlying parts.

Referring more specifically to the drawings, it will be noted that the feeding mechanism comprises two conveyor mechanisms 10 and 12, each being substantially a duplicate of the other. Each comprises a chain belt 14 travelling clockwise in Fig. 1, as indicated by the arrows. This chain belt carries a number of squi-spaced bulb carrier support bars 16 each secured to and supporting a bulb carrier 18, the bulb carriers being hollow cylinders with open ends. The lower ends of the carriers 18, see Fig. 2, slide along a base plate 20 as the chains move the carriers around their orbits. Each of the chains is trained about a pair of sprockets 22 and 24. The sprocket 22 is rotatably mounted on the upper end of a sprocket bolt 26, the end of the bolt being shouldered as at 27 to provide a seat for the sprocket hub. The sprocket 22 is held against vertical displacement by a nut 28 threaded on the upper end of the bolt. The shoulder of the bolt passes downwardly through base plate 20 and the bolt is rigidly supported on a frame bar 30, there being a bar at each side of the machine. To mount the bolt 26 there is provided an enlargement 32 thereon drawn against the upper surface of bar 30 by a nut 34 threaded on the lower end of the bolt. The sprocket 24 is secured to a shaft 36, as by a pin 38 passing through its hub into the shaft, the shaft being mounted between frame bar 30 and an upper frame member 40, there being two such frame members 40 each vertically above its corresponding bar 30. The shaft 36 passes downwardly through the plate 20 and is stepped into frame bar 30, the shaft being provided with enlargement 43 to prevent undesired downward displacement thereof. Upward movement of the shaft is prevented by the overlapping action of a cam of a Geneva movement as will be explained.

The chains are driven in step by step fashion through the intermediary of a pair of Geneva movements, one associated with each of the shafts 36. Toward the upper end of each shaft 36 is secured a Geneva spider 42, as by passing a pin through its hub 44 and through the shaft 36. Cooperating with the spider is a Geneva cam 46, this cam being rigidly secured on a shaft 48 stepped at its lower end 50 in frame bar 30 and having its Geneva cam follower carrying portion 52 at times overlapping the spider and bearing against the under side of upper frame member 40 to limit upward motion of shaft 48. A collar 49 is interposed between the spider 42 and the under surface of the frame member 40 to limit upward movement of the shaft 36. At the lower ends of the shafts 48 are sprockets 54 having their hubs fastened to the shafts and bearing against the upper surfaces of frame bars 30 to prevent downward displacement of the shafts 48. Suitably journaled in a pillow block 56 held to a frame bar 30 by cap bolts 58 is a continuously rotating drive shaft 60 located midway between the two frame bars and carrying at its upper end a drive sprocket 62. A sprocket chain is trained about the drive sprocket 62 and the two driven sprockets 54, driving both sprockets 54 in the same direction. Rotation of the shaft 60 thus drives the Geneva movements and through them the sprockets 24 and sprocket chain belts 14.

The frame bars 30 are maintained in suitable spaced relation by front spacer cross bar 64, the rear ends of the frame bars being supported in any suitable way as by gusset angles 66 secured to the bars 30 and to the frame work of the tube making machine. The upper frame members 40 are suitably supported from the frame members 30 by upper frame spacer blocks 68, two for each pair of frame bars and members 30, 40. The upper frame members are suitably spaced apart by front and rear cross bars 70. All of the bars and spacer blocks are suitably secured to adjoining parts by bolts, screws or the like. The base plate 20 is supported from cross bar 64 and the frame bars 30 by spacer insert blocks 72 and 73 which are suitably secured to the cross bar 64 and to certain of the blocks 68, as well as to the plate 20.

Figures 2, 3:
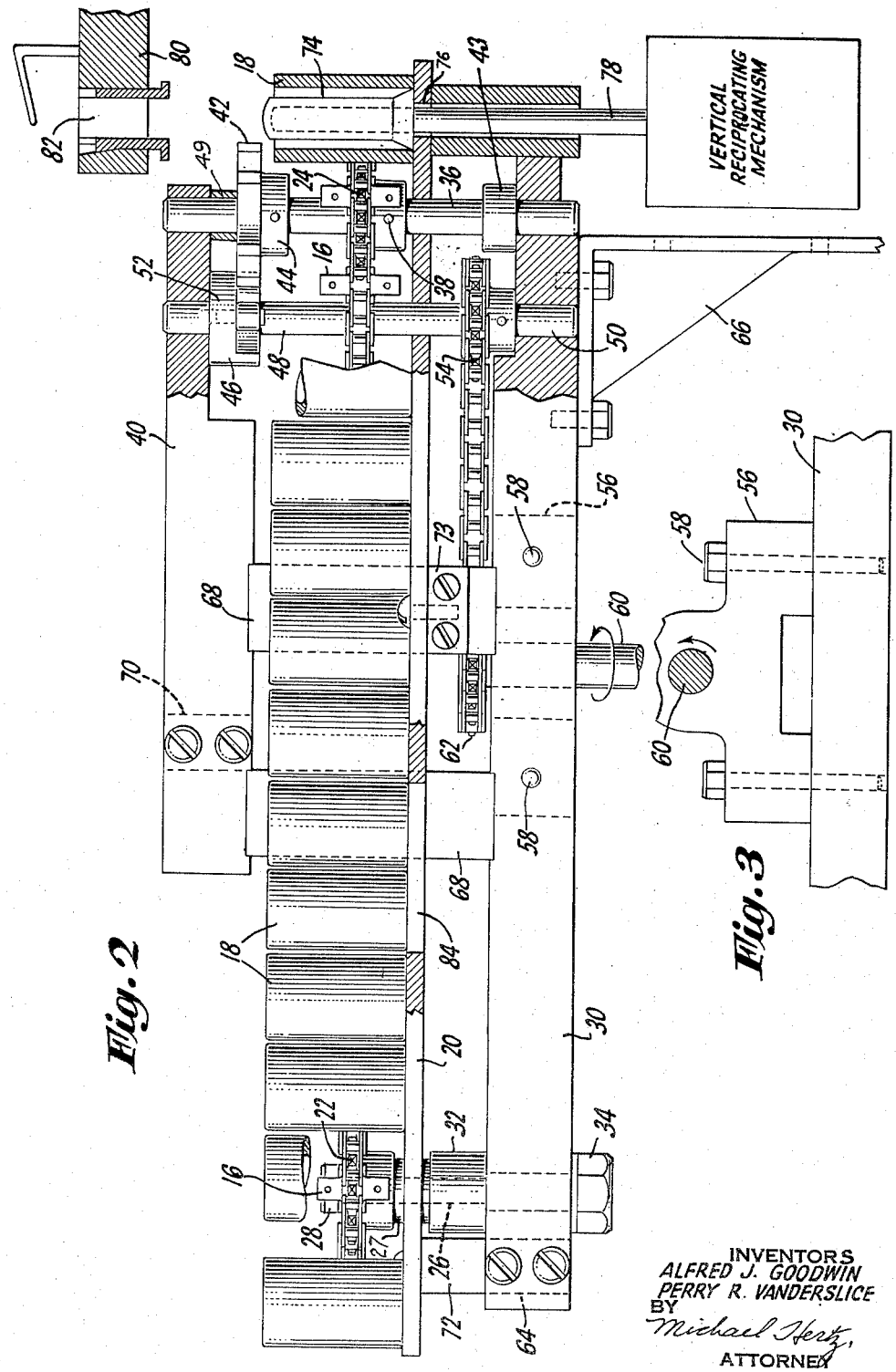
Fig. 2 is a side elevation of the feeding mechanism with portions broken away and showing the relationship between the feeding mechanism and the tube making machine.
Fig. 3 is a detail view, partly broken away, showing how a drive shaft is supported.

The conveyors 10 and 12 travel in the directions indicated by the arrows in Fig. 1. Bulbs of the size and shape such as indicated at 74 in Fig. 2 are loaded into the bulb carriers along the reaches of the belts travelling toward the bulb making machine. To facilitate selection of the proper runs of the conveyors, the top of the conveyors may be provided with a cover (not shown) having bulb admittance slots only above the desired lengths of the conveyors so that the operator will not feed bulbs into the reaches of the conveyors running toward her.

At the end of plate 20 adjacent the bulb forming machine there is located a mechanism to transfer the bulbs, one by one, into chucks in the tube making machine. For this purpose, the base plate 20 is apertured as at 76 and intermittently vertically reciprocable rods 78 timed in their movement with the intermittent motion of the conveyors and the movement of the turret 80 of the tube making machine reciprocate through the apertures to simultaneously engage the rounded ends of the bulbs and lift them into the superpositioned chucks 82 of the turret.

If due to malformation of some of the bulbs or other condition a bulb should be broken and be carried around with the bulb carriers beyond the transfer position of the conveyors, the broken glass would be emptied from the carriers by dropping through suitable rectangular dump apertures 84 in the base plate under the reaches of the conveyors which travel toward the operator. To ensure proper registration of the bulb carrier openings with the apertures as the carriers travel over the apertures, carrier cam guides 86 are provided. Each of these guides is suitably secured to the base plate 20 as by screws and each has an edge 90 along which the carriers are guided as they slide along on the base plate, the openings in the plate being sufficiently narrow to provide for support of the carriers as they travel across the openings. Glass in the carriers obviously would fall down through the apertures 84 to be disposed of at will, as the carriers are intermittently moved thereacross.

Having thus described the invention, what is claimed as new is:

A conveyor comprising an intermittently movable belt travelling in a closed path, a series of substantially vertical hollow open ended carriers mounted on and movable with said belt, said carriers being adapted to have bulbs loaded thereinto, a base plate beneath the path of movement of said carriers on which the lower ends of bulbs loaded into said carriers may slide during travel of the carriers, said base plate having an opening at one point in the path of movement of the carriers, means reciprocatable through said opening and movable in timed relation with the movement of said belt to eject a bulb from a carrier, said base plate having an additional opening in the path of movement of said carriers to permit dumping of the contents of a carrier should there be any such contents after traverse of said carrier past said reciprocatable means, and a guide along side an edge of said additional opening engageable with the carriers to ensure registration of the carriers with the opening.

References Cited in the file of this patent
UNITED STATES PATENTS

| | | |
|---|---|---|
| 1,711,773 | Coffman | May 7, 1929 |
| 1,763,738 | Avis | June 17, 1930 |
| 1,862,360 | Forte | June 7, 1932 |
| 2,124,423 | Ladewig et al. | July 19, 1938 |
| 2,476,707 | Danziger | July 19, 1949 |